United States Patent [19]

Hersey et al.

[11] Patent Number: 5,295,069
[45] Date of Patent: Mar. 15, 1994

[54] COMPUTER METHOD FOR RANKED HYPHENATION OF MULTILINGUAL TEXT

[75] Inventors: Ian L. Hersey, Bethesda; Richard L. Stephens, Gaithersburg; Anthony Zamora, Chevy Chase, all of Md.

[73] Assignee: International Business Machines Corporation, Armonk, N.Y.

[21] Appl. No.: 710,638

[22] Filed: Jun. 5, 1991

[51] Int. Cl.⁵ .............................................. G06F 15/40
[52] U.S. Cl. ................................................. 364/419.17
[58] Field of Search ........................................ 364/419

[56] References Cited

U.S. PATENT DOCUMENTS

| | | | |
|---|---|---|---|
| 4,028,677 | 6/1977 | Rosenbaum | 340/172.5 |
| 4,092,729 | 5/1978 | Rosenbaum et al. | 364/900 |
| 4,181,972 | 1/1980 | Casey | 364/900 |
| 4,456,969 | 6/1984 | Herzik et al. | 364/900 |
| 4,574,363 | 3/1986 | Carlgren et al. | 364/900 |
| 4,678,351 | 7/1987 | Curley | 400/64 |

OTHER PUBLICATIONS

M. S. Moore, et al., "Editor-Inserted Soft Hyphenation," *IBM Techanical Disclosure Bulletin*, Jun. 1986, pp. 383–384.

R. G. Carlgren, et al., "Minimum Redundancy Hyphenation Data Storage Technique", *IBM TDB*, Apr. 1984, pp. 6108–6109.

*Primary Examiner*—Roy N. Envall, Jr.
*Assistant Examiner*—Xuong Chung
*Attorney, Agent, or Firm*—John E. Hoel

[57] ABSTRACT

The hierarchy of the hyphenation points in a word is considered and the amount of space remaining in the line where the hyphenated word is to fit is determined, thus selecting the best hyphenation point for the word. Instead of selecting the last possible hyphen within the hot zone, the hot zone is scanned to find hyphenation points that may be better than the last hyphen within the hot zone. The higher a hyphenation point is in the hierarchy, the more preferred is the hyphen.

8 Claims, 11 Drawing Sheets

Text Processing System with Ranked Preferred Hyphenation

Memory 24

| Dictionary 32 | | |
|---|---|---|
| Dictionary Word Field | Hyphenation Mask field | Hyphenation Type Field |
| "Photomicroscopic" | 3 2 2 3 4 | − + − = − |
| "Superabundant" | 2 3 1 3 | − + − − |
| ... | ... | ... |

| Ranked Preferred Hyphenation Program 34 |
|---|
| Special Processing Soft Hyphen Subroutines 36 |
| Text Processing Program 38 |
| Operating System 40 |

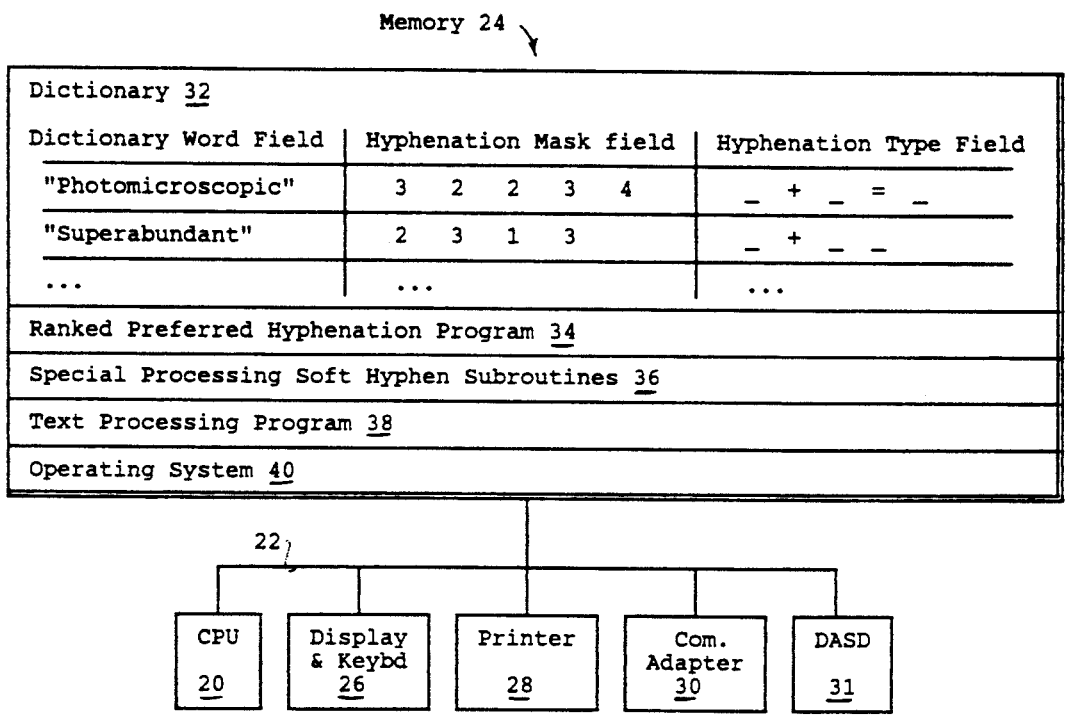
Figure 1 Text Processing System with Ranked Preferred Hyphenation

Figure 2  Hyphen Type Rank
Hyphen Type Rank (High to Low)
- is a hard hyphen (ASCII character 045)
+ is a component word boundry soft hyphen for a compound word
, is a special processing soft hyphen (non-English)
= is a morpheme boundry soft hyphen
_ is a syllable boundry soft hyphen
high rank
low rank Figure 3    Example of Three Types of Soft Hyphenation
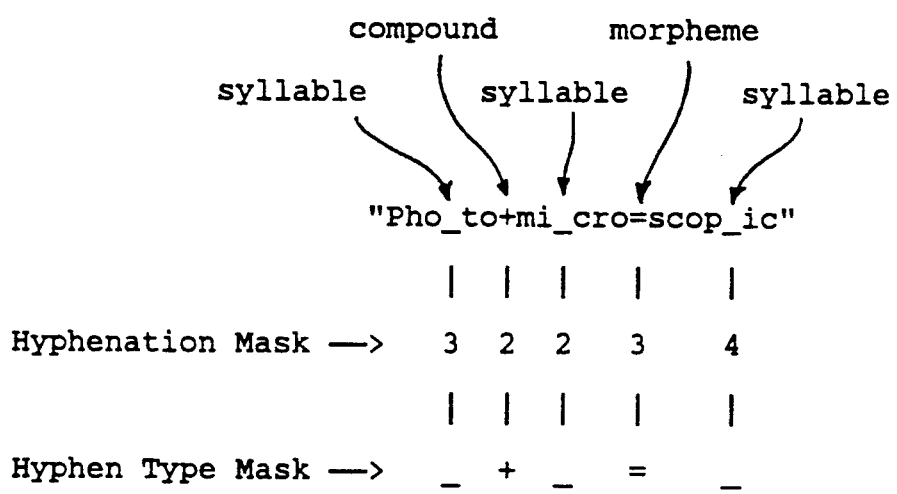

Figure 4  Comparison of Preferred Ranked and Traditional Hyphenation Methods

Ranked Preferred Hyphenation                Traditional Soft Hyphenation

```
                HZ  PZ      RM                              HZ          RM
a   P h o_t o+m i_c r|o=s|c o p_i c|        a'  P h o_t o_m i_c r|o_s c o p_i c|
b       P h o_t o+m i_c|r o=               b'      P h o_t o_m i_c|r o_s c o p_ |
c           P h o_t o+m i_c r|o=           c'          P h o_t o_m i_c r o_     |
d               P h o_t o+m|i_c|r o=       d'              P h o_t o_m|i_c r o_ |
e                   P h o_t o+m i_c r o=   e'                  P h o_t o_m i_c r o_ |
f                       P h o_t|o+m|i_c r o=  f'                   P h o_t|o_m i_c r o_ |
g                           P h o_t o+      g'                         P h o_t o_m i_ |
h                               P h|o_t|o+  h'                             P h o_t o_m i_ |
i                                   P|h o_t o+  i'                             P h o_t o_m i_ |
                HZ  PZ      RM                              HZ          RM
```

Figure 5 Example of Hard Hyphen Character and Three Soft Hyphen Types
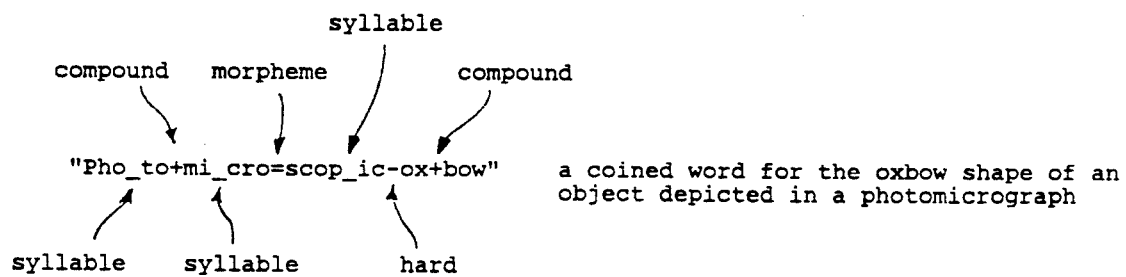
a coined word for the oxbow shape of an object depicted in a photomicrograph Figure 6 Example of Preferred Hyphenation Method on Word with
Hard Hyphen Character and Three Soft Hyphens

```
                            HZ&PZ              RM
a   P h o_t o+m i_c r o=s c o p_i c-o x+b o w
b     P h o_t o+m i_c r o=s c o|p_i c-
c       P h o_t o+m i_c r o=s c|o p_i c-
d         P h o_t o+m i_c r o=s|c o p_i c-
e           P h o_t o+m i_c r o=s c o p_i c-
f             P h o_t o+m i_c r|o=
g               P h o_t o+m i_c|r o=
h                 P h o_t o+m i_c r o=
i                   P h o_t o+m|i_c r o=
j                     P h o_t o+m i_c r o=
k                       P h o_t|o+m i_c r o =
l                         P h o_t o+
m                           P h|o_t o+
n                             P|h o_t o+
                            HZ&PZ              RM
```

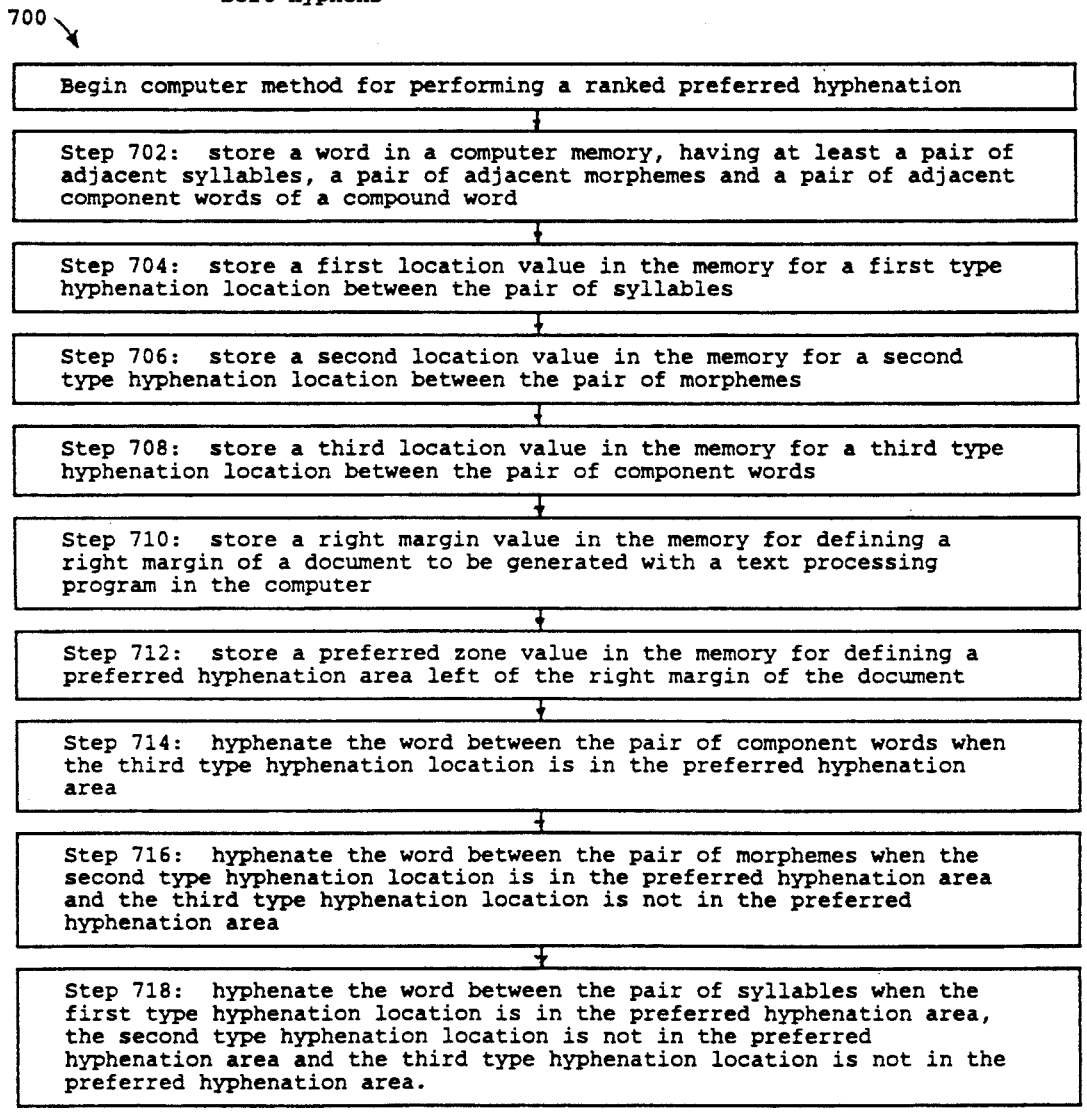

Figure 7  Flow Diagram for Hyphenating a Word with Three Types of Ranked Soft Hyphens

700

Begin computer method for performing a ranked preferred hyphenation

Step 702: store a word in a computer memory, having at least a pair of adjacent syllables, a pair of adjacent morphemes and a pair of adjacent component words of a compound word Step 704: store a first location value in the memory for a first type hyphenation location between the pair of syllables Step 706: store a second location value in the memory for a second type hyphenation location between the pair of morphemes Step 708: store a third location value in the memory for a third type hyphenation location between the pair of component words Step 710: store a right margin value in the memory for defining a right margin of a document to be generated with a text processing program in the computer Step 712: store a preferred zone value in the memory for defining a preferred hyphenation area left of the right margin of the document Step 714: hyphenate the word between the pair of component words when the third type hyphenation location is in the preferred hyphenation area Step 716: hyphenate the word between the pair of morphemes when the second type hyphenation location is in the preferred hyphenation area and the third type hyphenation location is not in the preferred hyphenation area Step 718: hyphenate the word between the pair of syllables when the first type hyphenation location is in the preferred hyphenation area, the second type hyphenation location is not in the preferred hyphenation area and the third type hyphenation location is not in the preferred hyphenation area.

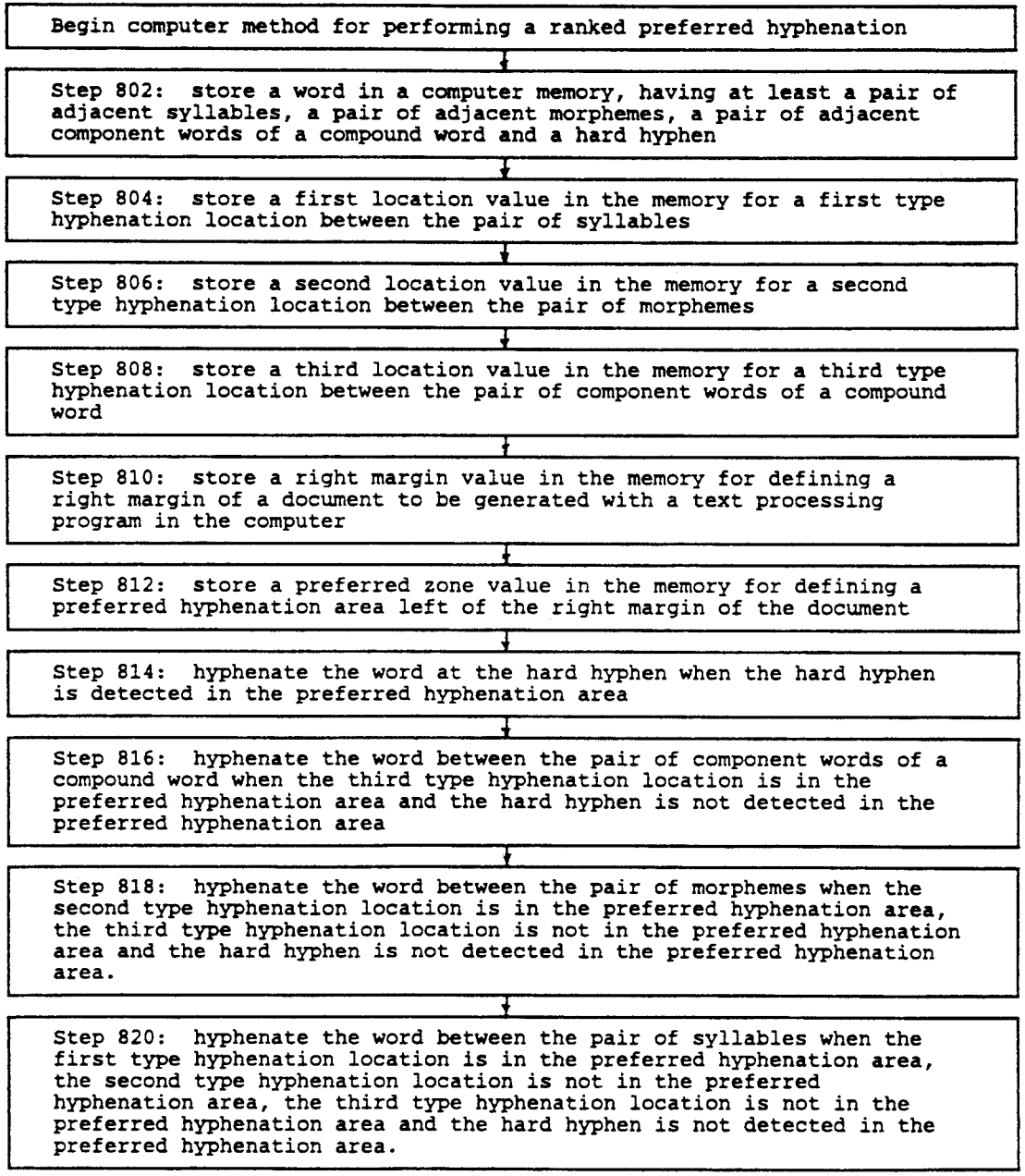
Figure 8  Flow Diagram for Hyphenating a word with Three Types of Ranked Soft Hyphens And a Hard Hyphen Figure 9 Special Soft Hyphen Processing for German Words
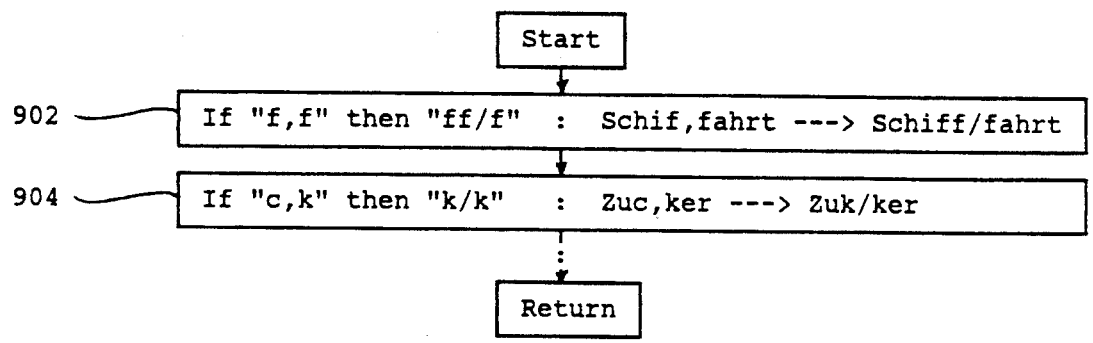

Figure 10  Dehyphenation for Hyphenated Special Processing German Words
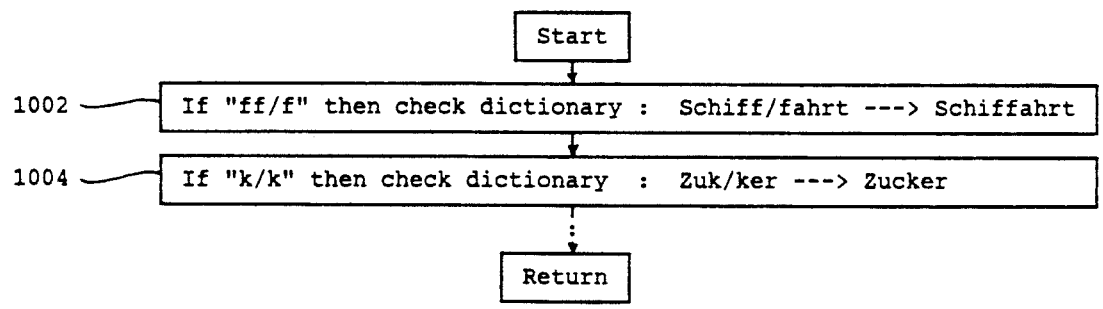

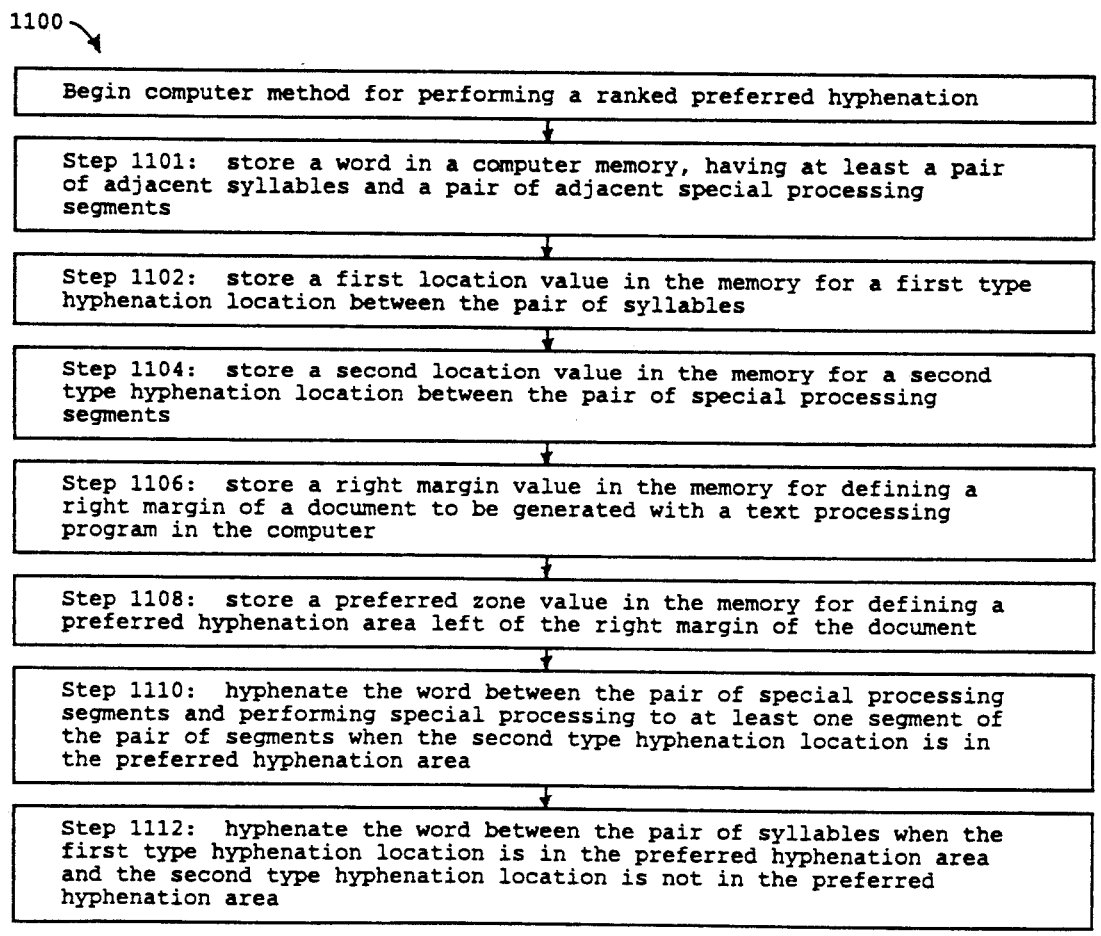
Figure 11 Flow Diagram of Preferred Ranked Special Processing Hyphenation
1100

COMPUTER METHOD FOR RANKED HYPHENATION OF MULTILINGUAL TEXT

BACKGROUND OF THE INVENTION

1. Technical Field

The invention disclosed broadly relates to computer methods, and particularly relates to a computer method for choosing hyphenation points in multilingual text.

2. Background Art

Mechanized hyphenation is a process that is necessary for computerized word processing and printing applications. Mechanized hyphenation has been attempted by the use of stored dictionary systems, rule-based systems, and statistical systems. Dictionary-based systems store the hyphenation for each dictionary entry. Rule-based systems use rules that may apply to more than one word. Rules may be non-specific and apply to any word, or they may be associated with specific words to provide their hyphenation points. Finally, the statistical systems use tables of hyphenation statistics based on a collection of words and apply these statistics to determine the hyphenation of other words. Some of these statistical techniques insert numbers within a word to be hyphenated that indicate the confidence with which the word can be hyphenated at that particular point.

Carlgren describes a system that combines several techniques in *IBM Technical Disclosure Bulletin*, Vol. 26, No. 11, pp. 6108-6109 and pp. 6095-6096. Carlgren elaborates on the combination of dictionary-based hyphenation and rule-based hyphenation in U.S. Pat. No. 4,574,363. Rosenbaum describes dictionary-based methods of hyphenation in U.S. Pat. Nos. 4,028,677 and 4,092,729. Herzik also describes a dictionary-based method for hyphenating multilingual text in U.S. Pat. No. 4,456,969. Zamora describes a rule-based method (IBM patent application Ser. No. 344,344 entitled "Computer Method for Executing Transformation Rules") for hyphenating text.

Another prior art technique by Moore in the *IBM Technical Disclosure Bulletin*, Vol. 29, No. 1, pp. 383-384 combines manual selection of hyphenation points and dictionary hyphenation.

OBJECTS OF THE INVENTION

An object of the invention is to provide an improved dictionary that makes it possible to rank the importance of each hyphenation point in a word.

Another object of the invention is to provide an improved computer process to select the linguistically best hyphenation point in a word.

A further object of the invention is to provide a mechanism for dehyphenating previously hyphenated words.

SUMMARY OF THE INVENTION

These and other objects are accomplished by the disclosed invention. A computer method is disclosed for performing a ranked preferred hyphenation of words. The method includes the step of storing a word in a computer memory, having at least a pair of adjacent syllables, a pair of adjacent morphemes and a pair of adjacent component words. The method continues by storing a first location value in the memory for a first type hyphenation location between the pair of syllables. The method continues by storing a second location value in the memory for a second type hyphenation location between the pair of morphemes. The method continues by storing a third location value in the memory for a third type hyphenation location between the pair of component words. The method continues by storing a right margin value in the memory for defining a right margin of a document to be generated with a text processing program in the computer.

The method continues by storing a preferred zone value in the memory for defining a preferred hyphenation area left of the right margin of the document. The method continues by hyphenating the word between the pair of component words when the third type hyphenation location is in the preferred hyphenation area. The method continues by hyphenating the word between the pair of morphemes when the second type hyphenation location is in the preferred hyphenation area and the third type hyphenation location is not in the preferred hyphenation area.

Finally, the method continues by hyphenating the word between the pair of syllables when the first type hyphenation location is in the preferred hyphenation area, the second type hyphenation location is not in the preferred hyphenation area and the third type hyphenation location is not in the preferred hyphenation area. In this manner the best hyphenation point for the word is selected.

DESCRIPTION OF THE FIGURES

The invention will be more fully appreciated by referring to the accompanying figures.

FIG. 1 shows a Text Processing System with Ranked Preferred Hyphenation.

FIG. 2 shows a Hyphen Type Ranking.

FIG. 3 shows a Example of Three Types of Soft Hyphenation.

FIG. 4 shows a Comparison of Preferred Ranked and Traditional Hyphenation Methods.

FIG. 5 shows a Example of Hard Hyphen Character and Three Soft Hyphens.

FIG. 6 shows a Example of Preferred Hyphenation Method on Word with Hard Hyphen Character and Three Soft Hyphens.

FIG. 7 shows a Flow Diagram for Hyphenating a Word with Three Types of Ranked Soft Hyphens.

FIG. 8 shows a Flow Diagram for Hyphenating a word with Three Types of Ranked Soft Hyphens And a Hard Hyphen.

FIG. 9 shows a Special Soft Hyphen Processing for German Words.

FIG. 10 shows a Dehyphenation for Hyphenated Special Processing German Words.

FIG. 11 shows a Flow Diagram of Preferred Ranked Special Processing Hyphenation.

DISCUSSION OF THE PREFERRED EMBODIMENT

The invention consists of a manually-constructed dictionary that identifies hyphenation points and their types and a process for selecting the best hyphenation point under particular circumstances. The dictionary entries contain the traditional hard hyphens (-) and soft hyphens (_) so that a word like "high-spirited" is marked as "high-spir_it_ed." In addition to these marks the equal (=) indicates a preferred hyphen, a plus (+) indicates a component hyphen, a comma (,) indicates a hyphenation point requiring special processing. The hierarchy of these marks in decreasing preference is: 1) hard hyphen; 2) component hyphen; 3) special processing hyphen; 4) preferred hyphen; and 5) soft hyphen. The first three types generally delimit word component boundaries, the preferred hyphen usually marks morpheme boundaries, and the soft hyphen separates syllable boundaries.

The process of automatically hyphenating a word requires an input parameter called the "hot zone" and consisting of a number that indicates how much latitude the program has for selecting a hyphenation point. If the number is 5, for example, the program will try to find a hyphenation point within the five characters of the word that fall into the "hot zone." The usual procedure in the prior art techniques is to choose the last possible hyphen within the hot zone. However, this often produces inappropriate hyphenation.

This invention improves upon the prior art by taking into consideration the hierarchy of the hyphenation points in the word and the amount of space remaining in the line where the hyphenated word is to fit, thus selecting the best hyphenation point for the word. Instead of selecting the last possible hyphen within the hot zone, this invention scans the hot zone and a small portion preceding the hot zone to find hyphenation points that may be better than the last hyphen within the hot zone. The higher a hyphenation point is in the hierarchy described above, the better the hyphen is.

A complementary function to hyphenation is dehyphenation. Dehyphenation is the removal of hyphens. This process is necessary when hyphenated text is changed in a word processing system and previously hyphenated components of a word need to be put back together. In general, dehyphenation is a process symmetrical to hyphenation. The language-specific exceptions to dehyphenation and the specific rules for hyphenation points requiring special processing (those marked with a comma) are described below. In addition, the hyphenation process incorporates traditional hyphenation rules for the following languages:

CATALAN

A high dot that separates a double "l" disappears when the word is hyphenated at that point. Thus, "novel.la" becomes "novel-/la" where the slash represents a line break.

DUTCH

When a word is hyphenated preceding a vowel with a dieresis, the dieresis is removed. The word "geïsoleerd" when hyphenated after "ge" loses the dieresis and becomes "ge-/isoleerd." Words such as this are marked in the dictionary with a comma at that point: "ge,isoleerd" and it is necessary to translate the character with dieresis to the character without dieresis in the corresponding upper or lower case.

Another special case is the elimination of a double letter, e.g., "chocolaatje" hyphenates as "chocola-/tje." The dictionary entry for this word is marked as "chocola,atje." Words with identical vowels on either side of the special hyphenation marker lose the second vowel upon hyphenation except when the vowel is "e." For the cases with "e,e," the following rule is used: "e,etje"—"é-/tje," as in the following words:

| | |
|---|---|
| cafeetje | café-tje |
| clicheetje | cliché-tje |
| comiteetje | comité-tje |

There are three exceptions to this rule (six if you count the plural forms) which must be handled differently. These are:

| | |
|---|---|
| dejeuneetje | dejeuner-tje |
| dineetje | diner-tje |
| soupeetje | souper-tje |

Dehyphenation of these specially-processed words requires application of the following transformation rules:

| Hyphen context | Transformation | Example |
|---|---|---|
| a-a | aä | naäpen |
| a-e | aë | pentaëder |
| a-i | aï | maïzena |
| a-u | aü | Kafarnaüm |
| e-e | eë | geërfd |
| e-ij | eij | beijverd |
| e-i | eï | beïnvloeden |
| e-ui | eui | geuit |
| e-u | eü | geürineerd |
| i-ee | iee | officieel |
| i-eu | ieu | officieus |
| i-e | ië | officiële |
| o-e | oë | zoëven |
| o-i | oï | colloïdaal |
| o-o | oö | zoölogie |
| u-i | uï | fluïdum |
| u-u | uü | vacuüm |
| a-tje | aatje | chocolaatje |
| é-tje | eetje | employeetje |
| o-tje | ootje | autootje |
| u-tje | uutje | menuutje |
| dejeuner-tje | dejeuneetje | dejeuneetjes |
| diner-tje | dineetje | dineetjes |
| souper-tje | soupeetje | soupeetjes |

GERMAN

A soft hyphen between "c" and "k" requires changing the "c" to another "k." The Germany word "Zuc_ker" (sugar) is hyphenated "Zuk-/ker," where the "ck" changes to "k-k."

Germany requires special processing for compound words with letters that have been elided. In general, these words involve a double consonant and a vowel, e.g., "Schiffahrt" ("navigation") is hyphenated as "Schiff-/fahrt." The dictionary entry for this word is marked as "Schif,fahrt."

PORTUGUESE

When a word is hyphenated at a hard hyphen another hyphen is added at the beginning of the next line. Thus, the Portuguese word "guarda-chuva" ("umbrella") is hyphenated as a "guarda-/-chuva."

The dictionary for specifying hyphenation can be extended by the use of hyphenation rules for endings. This can save substantial, storage space. Consider, for example, the word "arm=bånds+ur" (Danish for "watch") which has a preferred hyphen point after "arm" (shown here by an equal sign), and a component hyphen point before the final "ur" (shown as a plus sign).

By giving only the hyphenation positions and types for one form of the word, the hyphenation for variants, such as plurals, can be derived from application of rules associated with each suffix. Since the suffixes may apply to many types of words, it is necessary to give priority to the hyphenation types indicated in the dictionary when hyphenating at the corresponding positions. For example, the word "armbandsure" which adds an "e" ending to the stem "armbandsur," is associated with a rule "_u_," which would give a hyphenation "arm=bånds_u_re." However, because the position between the "s" and the "u" is "+" (compound) in the dictionary, the resulting hyphenation must be "arm=bånds+u_re."

FIG. 1 shows Text Processing System with Ranked Preferred Hyphenation in accordance with the invention. CPU 20 is connected by Bus 22 to the Memory 24, the Display and keyboard 26, the printer 28, the communications adapter 30 and the DASD 31.

Memory 24 is partitioned into the Dictionary 32, the Ranked Preferred Hyphenation Program 34, the Special Processing Soft Hyphen Subroutines 36, the Text Processing Program 38 and the Operating System 40. The CPU 20 executes the programmed executable statements of the programs 34, 36, 38, and 40 in the memory 24, operating on text input from the keyboard 26 and displayed on the display, the finished text then being output to the printer 28, the communications adapter 30 or the DASD 31.

The ranked preferred hyphenation program 34 is a programmed sequence of executable statements which embody the computer methods depicted in the flow diagrams of FIGS. 7, 8 and 11. The method 700 of FIG. 7, is a computer method for Hyphenating a Word with Three Types of Ranked Soft Hyphens. The method 800 of FIG. 8 is a computer method for Hyphenating a word with Three Types of Ranked Soft Hyphens And a Hard Hyphen. The method 1100 of FIG. 11 is a computer method for Preferred Ranked Special Processing Hyphenation.

The special processing soft hyphen subroutines 36 are programmed sequences of executable statements which embody computer methods for hyphenating the word between the pair of special processing segments and performing special processing to at least one segment of the pair of segments when the second type hyphenation location is in the preferred hyphenation area. The special processing steps can be any of those previously discussed herein, for German, Catalan, Dutch, Portuguese and other languages. An example is given in FIG. 9 which shows the Special Soft Hyphen Processing for German Words. The reverse process of dehyphenation is also embodied in the programmed sequences of the subroutines 36. For example, FIG. 10 shows the Dehyphenation for Hyphenated Special Processing German Words, which can occur when reflowing a paragraph.

The Dictionary 32 includes a plurality of words in the Dictionary Word Field, each word associated with its own Hyphenation Mask field and Hyphenation Type Field.

In FIG. 1, Dictionary Word Field includes words such as

"Photomicroscopic" and "Superabundant". Associated with the word "Photomicroscopic" is its hyphenation mask "3 2 2 3 4". The first number "3" represents an offset from the beginning of the word to the first hyphenation point between "o" and "t". Each number thereafter represents the offset from the preceding hyphenation point to the next hyphenation point.

Also associated with the word "Photomicroscopic" is its hyphenation type field "_+_=_". Each symbol represents the rank of the corresponding hyphen located by the hyphenation mask field for the word.

Similarly the word "Superabundant" has a Hyphenation Mask field and a Hyphenation Type Field of "2 3 1 3" and "_+___", respectively.

FIG. 2 shows the Hyphen Type Rank. The Hyphen Type Rank from High rank to Low rank is as follows.

— is a hard hyphen (ASCII character 045), the highest rank.

+ is a component word boundary soft hyphen for a compound word.

, is a special processing soft hyphen (non-English).

= is a morpheme boundary soft hyphen.

_is a syllable boundary soft hyphen, the lowest rank.

FIG. 3 shows an Example of Three Types of Soft Hyphenation for the word "photomicroscopic". "Pho_to+mi_cro=scop_ic" has as its Hyphenation Mask "3 2 2 3 4 " and as its Hyphen Type Mask "_+_=_".

FIG. 4 shows a Comparison of Preferred Ranked and Traditional Hyphenation Methods. The hot zone is designated HZ, the preferred processing zone is designated PZ and the right margin is designated RM.

The hot zone HZ has the function defining the left boundary of the region between itself and the right margin RM where traditional hyphenation processing takes place. If the function of preferred ranked hyphenation is disabled for a particular application, the hot zone HZ will define the area where all soft hyphenation will take place, the process being performed on the nearest soft hyphenation point to the right margin RM to split the word in the traditional hyphenation process. However, if the function of preferred ranked hyphenation is enabled for a particular application, in accordance with the invention, then the preferred zone PZ will define the left boundary of the area between itself and the right margin RM where the ranked hyphenation process will take place, the inventive process being performed on the highest ranking hyphenation point within the preferred zone PZ. The preferred zone PZ can be defined by the user to be located at any column in the document working area, and it can be coincident with the hot zone HZ as is shown in FIG. 6 or PZ can be separate from HZ as is shown in FIG. 4.

Note the difference between the preferred ranked method of the invention and the traditional method for the words on line b and b' in FIG. 4. "Photomicro" is the hyphenation resulting from the invention, which divides the word at the morpheme boundary "micro". In the traditional method of hyphenation, the last available hyphenation point is selected, which is the syllable boundary "scop", which is not a linguistically preferred location for dividing the word.

Note again the lines g, h, and i in FIG. 4, for the preferred ranked method of the invention and compare this with the traditional method of lines g', h', and i', respectively. The preferred ranked method of the invention divides the word at the compound word component word boundary "photo". In the traditional method of hyphenation, the last available hyphenation point is selected, which is the syllable boundary "photomi", which is not a linguistically preferred location for dividing the word.

FIG. 5 shows an Example of Hard Hyphen Character and Three Soft Hyphens. The word "photomicroscopic-oxbow" is a coined word for the oxbow shape of an object depicted in a photomicrograph. Its ranked hyphenation points are "Pho‒to+mi‒cro=scop‒ic-ox+bow".

FIG. 6 is an Example of Preferred Hyphenation Method on a Word with a Hard Hyphen Character and Three Soft Hyphens, for example "photomicroscopic-oxbow". Note that in line b, the word is hyphenated at the preferred hard hyphen "photomicroscopic", in accordance with the invention, instead of at the last available syllable "photomicroscopic-ox", which would be the traditional method of hyphenation.

FIG. 7 is a Flow Diagram for Hyphenating a Word with Three Types of Ranked Soft Hyphens.

The method 700 is A computer method for performing a ranked preferred hyphenation of words.

The method performs step 702 storing a word in a computer memory, having at least a pair of adjacent syllables, a pair of adjacent morphemes and a pair of adjacent component words of a compound word.

The method then performs step 704 storing a first location value in the memory for a first type hyphenation location between the pair of syllables.

The method then performs step 706 storing a second location value in the memory for a second type hyphenation location between the pair of morphemes.

The method then performs step 708 storing a third location value in the memory for a third type hyphenation location between the pair of component words.

The method then performs step 710 storing a right margin value in the memory for defining a right margin of a document to be generated with a text processing program in the computer.

The method then performs step 712 storing a preferred zone value in the memory for defining a preferred hyphenation area left of the right margin of the document.

The method then performs step 714 hyphenating the word between the pair of component words when the third type hyphenation location is in the preferred hyphenation area.

The method then performs step 716 hyphenating the word between the pair of morphemes when the second type hyphenation location is in the preferred hyphenation area and the third type hyphenation location is not in the preferred hyphenation area.

The method then performs step 718 hyphenating the word between the pair of syllables when the first type hyphenation location is in the preferred hyphenation area, the second type hyphenation location is not in the preferred hyphenation area and the third type hyphenation location is not in the preferred hyphenation area.

FIG. 8 is a Flow Diagram for Hyphenating a word with Three Types of Ranked Soft Hyphens And a Hard Hyphen.

The method 800 is a computer method for performing a ranked preferred hyphenation of words.

The method performs step 802 storing a word in a computer memory, having at least a pair of adjacent syllables, a pair of adjacent morphemes, a pair of adjacent component words of a compound word and a hard hyphen.

The method then performs step 804 storing a first location value in the memory for a first type hyphenation location between the pair of syllables.

The method then performs step 806 storing a second location value in the memory for a second type hyphenation location between the pair of morphemes.

The method then performs step 808 storing a third location value in the memory for a third type hyphenation location between the pair of component words of a compound word.

The method then performs step 810 storing a right margin value in the memory for defining a right margin of a document to be generated with a text processing program in the computer.

The method then performs step 812 storing a preferred zone value in the memory for defining a preferred hyphenation area left of the right margin of the document.

The method then performs step 814 hyphenating the word at the hard hyphen when the hard hyphen is detected in the preferred hyphenation area.

The method then performs step 816 hyphenating the word between the pair of component words of a compound word when the third type hyphenation location is in the preferred hyphenation area and the hard hyphen is not detected in the preferred hyphenation area.

The method then performs step 818 hyphenating the word between the pair of morphemes when the second type hyphenation location is in the preferred hyphenation area, the third type hyphenation location is not in the preferred hyphenation area and the hard hyphen is not detected in the preferred hyphenation area.

The method then performs step 820 hyphenating the word between the pair of syllables when the first type hyphenation location is in the preferred hyphenation area, the second type hyphenation location is not in the preferred hyphenation area, the third type hyphenation location is not in the preferred hyphenation area and the hard hyphen is not detected in the preferred hyphenation area.

FIG. 9 shows the Special Soft Hyphen Processing for German Words.

Step 902 is: If "f,f" then "ff/f". The Dictionary in memory 24 has the entry "Schif,fahrt", and the preferred hyphenation adds an "f" to "Schiff" and places the remaining word "fahrt" on the next line.

Step 904 is: If "c,k" then "k/k". The dictionary in memory 24 has the entry "Zuc,ker", and the preferred hyphenation changes the "c" to a "k" for "Zuk" and places the remaining "ker" on the next line.

FIG. 10 shows the Dehyphenation for Hyphenated Special Processing German Words. This can occur when reflowing a paragraph.

Step 1002 is:

If "ff/f" then check the dictionary in memory 24. If the word "Schiff" is at the end of the first line and the word "fahrt" is at the beginning of the second line, then remove the "f" in "Schiff" and form the recombined word "Schiffahrt".

Step 1004 is:

If "k/k" then check the dictionary in memory 24. If the word "Zuk" is at the end of the first line and the word "ker" is at the beginning of the second line, then change the "k" to "c" in "Zuk" and form the recombined word "Zucker".

FIG. 11 is a Flow Diagram of Preferred Ranked Special Processing Hyphenation.

The method 1100 of FIG. 11 performs step 1101 storing a word in a computer memory, having at least a pair of adjacent syllables and a pair of adjacent special processing segments.

The method then performs step 1102 storing a first location value in the memory for a first type hyphenation location between the pair of syllables.

The method then performs step 1104 storing a second location value in the memory for a second type hyphenation location between the pair of special processing segments.

The method then performs step 1106 storing a right margin value in the memory for defining a right margin of a document to be generated with a text processing program in the computer.

The method then performs step 1108 storing a preferred zone value in the memory for defining a preferred hyphenation area left of the right margin of the document.

The method then performs step 1110 hyphenating the word between the pair of special processing segments and performing special processing to at least one segment of the pair of segments when the second type hyphenation location is in the preferred hyphenation area. The special processing steps can be any of those previously discussed herein, for German, Catalan, Dutch, Portuguese and other languages.

The method then performs step 1112 hyphenating the word between the pair of syllables when the first type hyphenation location is in the preferred hyphenation area and the second type hyphenation location is not in the preferred hyphenation area.

The resulting hyphenation is the most preferred for conveying the author's meaning to the reader.

Although a specific embodiment of the invention has been disclosed, it will be understood by those having skill in the art that changes can be made to the specific embodiment without departing from the spirit and the scope of the invention.

What is claimed is:

1. A computer method for performing a ranked preferred hyphenation of words, comprising the steps of:
    storing a word in a computer memory, having at least a pair of adjacent syllables and a pair of adjacent morphemes;
    storing a first location value in said memory for a first type hyphenation location between said pair of syllables;
    storing a second location value in said memory for a second type hyphenation location between said pair of morphemes;
    storing a right margin value in said memory for defining a right margin of a document to be generated with a text processing program in said computer;
    storing a preferred zone value in said memory for defining a preferred hyphenation area left of said right margin of said document;
    hyphenating said word between said pair of morphemes when said second type hyphenation location is in said preferred hyphenation area;
    hyphenating said word between said pair of syllables when said first type hyphenation location is in said preferred hyphenation area and said second type hyphenation location is not in said preferred hyphenation area.

2. A computer method for performing a ranked preferred hyphenation of words, comprising the steps of:
    storing a word in a computer memory, having at least a pair of adjacent syllables and a pair of adjacent component words;
    storing a first location value in said memory for a first type hyphenation location between said pair of syllables;
    storing a second location value in said memory for a second type hyphenation location between said pair of component words;
    storing a right margin value in said memory for defining a right margin of a document to be generated with a text processing program in said computer;
    storing a preferred zone value in said memory for defining a preferred hyphenation area left of said right margin of said document;
    hyphenating said word between said pair of component words when said second type hyphenation location is in said preferred hyphenation area;
    hyphenating said word between said pair of syllables when said first type hyphenation location is in said preferred hyphenation area and said second type hyphenation location is not in said preferred hyphenation area.

3. A computer method for performing a ranked preferred hyphenation of words, comprising the steps of:
    storing a word in a computer memory, having at least a pair of adjacent morphemes and a pair of adjacent component words;
    storing a first location value in said memory for a first type hyphenation location between said pair of morphemes;
    storing a second location value in said memory for a second type hyphenation location between said pair of component words;
    storing a right margin value in said memory for defining a right margin of a document to be generated with a text processing program in said computer;
    storing a preferred zone value in said memory for defining a preferred hyphenation area left of said right margin of said document;
    hyphenating said word between said pair of component words when said second type hyphenation location is in said preferred hyphenation area;
    hyphenating said word between said pair of morphemes when said first type hyphenation location is in said preferred hyphenation area and said second type hyphenation location is not in said preferred hyphenation area.

4. A computer method for performing a ranked preferred hyphenation of words, comprising the steps of:
    storing a word in a computer memory, having at least a pair of adjacent syllables, a pair of adjacent morphemes and a pair of adjacent component words;
    storing a first location value in said memory for a first type hyphenation location between said pair of syllables;
    storing a second location value in said memory for a second type hyphenation location between said pair of morphemes;
    storing a third location value in said memory for a third type hyphenation location between said pair of component words;
    storing a right margin value in said memory for defining a right margin of a document to be generated with a text processing program in said computer;
    storing a preferred zone value in said memory for defining a preferred hyphenation area left of said right margin of said document;
    hyphenating said word between said pair of component words when said third type hyphenation location is in said preferred hyphenation area;
    hyphenating said word between said pair of morphemes when said second type hyphenation location is in said preferred hyphenation area and said third type hyphenation location is not in said preferred hyphenation area;

hyphenating said word between said pair of syllables when said first type hyphenation location is in said preferred hyphenation area, said second type hyphenation location is not in said preferred hyphenation area and said third type hyphenation location is not in said preferred hyphenation area.

5. A computer method for performing a ranked preferred hyphenation of words, comprising the steps of:

storing a word in a computer memory, having at least a pair of adjacent syllables, a pair of adjacent morphemes and a hard hyphen;

storing a first location value in said memory for a first type hyphenation location between said pair of syllables;

storing a second location value in said memory for a second type hyphenation location between said pair of morphemes;

storing a right margin value in said memory for defining a right margin of a document to be generated with a text processing program in said computer;

storing a preferred zone value in said memory for defining a preferred hyphenation area left of said right margin of said document;

hyphenating said word at said hard hyphen when said hard hyphen is detected in said preferred hyphenation area;

hyphenating said word between said pair of morphemes when said second type hyphenation location is in said preferred hyphenation area and said hard hyphen is not detected in said preferred hyphenation area;

hyphenating said word between said pair of syllables when said first type hyphenation location is in said preferred hyphenation area, said second type hyphenation location is not in said preferred hyphenation area and said hard hyphen is not detected in said preferred hyphenation area.

6. A computer method for performing a ranked preferred hyphenation of words, comprising the steps of:

storing a word in a computer memory, having at least a pair of adjacent syllables, a pair of adjacent component words of a compound word and a hard hyphen;

storing a first location value in said memory for a first type hyphenation location between said pair of syllables;

storing a second location value in said memory for a second type hyphenation location between said pair of component words of a compound word;

storing a right margin value in said memory for defining a right margin of a document to be generated with a text processing program in said computer;

storing a preferred zone value in said memory for defining a preferred hyphenation area left of said right margin of said document;

hyphenating said word at said hard hyphen when said hard hyphen is detected in said preferred hyphenation area;

hyphenating said word between said pair of component words of a compound word when said second type hyphenation location is in said preferred hyphenation area and said hard hyphen is not detected in said preferred hyphenation area;

hyphenating said word between said pair of syllables when said first type hyphenation location is in said preferred hyphenation area, said second type hyphenation location is not in said preferred hyphenation area and said hard hyphen is not detected in said preferred hyphenation area.

7. A computer method for performing a ranked preferred hyphenation of words, comprising the steps of:

storing a word in a computer memory, having at least a pair of adjacent syllables, a pair of adjacent morphemes, a pair of adjacent component words of a compound word and a hard hyphen;

storing a first location value in said memory for a first type hyphenation location between said pair of syllables;

storing a second location value in said memory for a second type hyphenation location between said pair of morphemes;

storing a third location value in said memory for a third type hyphenation location between said pair of component words of a compound word;

storing a right margin value in said memory for defining a right margin of a document to be generated with a text processing program in said computer;

storing a preferred zone value in said memory for defining a preferred hyphenation area left of said right margin of said document;

hyphenating said word at said hard hyphen when said hard hyphen is detected in said preferred hyphenation area;

hyphenating said word between said pair of component words of a compound word when said third type hyphenation location is in said preferred hyphenation area and said hard hyphen is not detected in said preferred hyphenation area;

hyphenating said word between said pair of morphemes when said second type hyphenation location is in said preferred hyphenation area, said third type hyphenation location is not in said preferred hyphenation area and said hard hyphen is not detected in said preferred hyphenation area.

hyphenating said word between said pair of syllables when said first type hyphenation location is in said preferred hyphenation area, said second type hyphenation location is not in said preferred hyphenation area, said third type hyphenation location is not in said preferred hyphenation area and said hard hyphen is not detected in said preferred hyphenation area.

8. A computer method for performing a ranked preferred hyphenation of words, comprising the steps of:

storing a word in a computer memory, having at least a pair of adjacent syllables and a pair of adjacent special processing segments;

storing a first location value in said memory for a first type hyphenation location between said pair of syllables;

storing a second location value in said memory for a second type hyphenation location between said pair of special processing segments;

storing a right margin value in said memory for defining a right margin of a document to be generated with a text processing program in said computer;

storing a preferred zone value in said memory for defining a preferred hyphenation area left of said right margin of said document;

hyphenating said word between said pair of special processing segments and performing special processing to at least one segment of said pair of segments when said second type hyphenation location is in said preferred hyphenation area;

hyphenating said word between said pair of syllables when said first type hyphenation location is in said preferred hyphenation area and said second type hyphenation location is not in said preferred hyphenation area.

* * * * *

UNITED STATES PATENT AND TRADEMARK OFFICE
CERTIFICATE OF CORRECTION

PATENT NO. : 5,295,069
DATED : March 15, 1994
INVENTOR(S) : Ian L. Hersey, et al It is certified that error appears in the above-indentified patent and that said Letters Patent is hereby corrected as shown below:

On the title page item [75] "Anthony Zamora" should read --Antonio Zamora--.

Signed and Sealed this

Eighteenth Day of October, 1994

Attest:

BRUCE LEHMAN

*Attesting Officer*  *Commissioner of Patents and Trademarks*